United States Patent

[11] 3,624,678

| [72] | Inventor | Louis R. Falce |
| | | Santa Monica, Calif. |
| [21] | Appl. No. | 830,173 |
| [22] | Filed | Apr. 15, 1969 |
| [45] | Patented | Nov. 30, 1971 |
| [73] | Assignee | Hughes Aircraft Company |
| | | Culver City, Calif. |
| | | Original application Sept. 15, 1966, Ser. No. 579,648, now abandoned. Divided and this application Apr. 15, 1969, Ser. No. 830,173 |

[54] METHOD FOR MAKING DIELECTRIC-TO-METAL JOINTS FOR SLOW-WAVE STRUCTURE ASSEMBLIES
8 Claims, 14 Drawing Figs.

| [52] | U.S. Cl. | 29/600, 29/25.14, 29/471.7, 29/472.7, 29/494, 29/502, 29/605, 117/212 |
| [51] | Int. Cl. | H01p 11/00 |
| [50] | Field of Search | 315/3.5; 29/600, 601, 25.14, 502, 472.7, 494, 471.7 |

[56] References Cited
UNITED STATES PATENTS

| 3,131,460 | 5/1964 | Allen | 29/472.7 |
| 2,922,067 | 1/1960 | Van Dien | 315/3.5 |
| 3,368,103 | 2/1968 | Thall | 315/3.5 |
| 3,421,040 | 1/1969 | Winslow | 315/3.5 |

Primary Examiner—John F. Campbell
Assistant Examiner—Robert W. Church
Attorneys—James K. Haskell and Paul M. Coble ABSTRACT: In the disclosed method for fabricating a slow-wave structure supporting and encasing assembly, a film of elemental chromium is vapor deposited onto a portion of each of a plurality of beryllia rods. The rods are assembled about the peripheral surface of a molybdenum slow-wave structure, at least a portion of which has been provided with a coating of copper braze material. The assembly is heated in a dry hydrogen atmosphere to a temperature sufficient to braze the rods to the slow-wave structure. Chromium is selectively removed from regions of the inwardly facing surface of the rods not contacting the slow-wave structure, and a coating of copper-silver braze material is deposited over portions of the outwardly facing surfaces of the rods. The slow-wave structure and the rods are inserted into an encasing barrel of a material having a thermal coefficient of expansion substantially the same as that of the rods, with the braze material on the outwardly facing surfaces of the rods contacting the encasing barrel. The assembly is heated in a dry hydrogen atmosphere to a temperature sufficient to braze the rods to the encasing barrel.

PATENTED NOV 30 1971 3,624,678
SHEET 1 OF 3
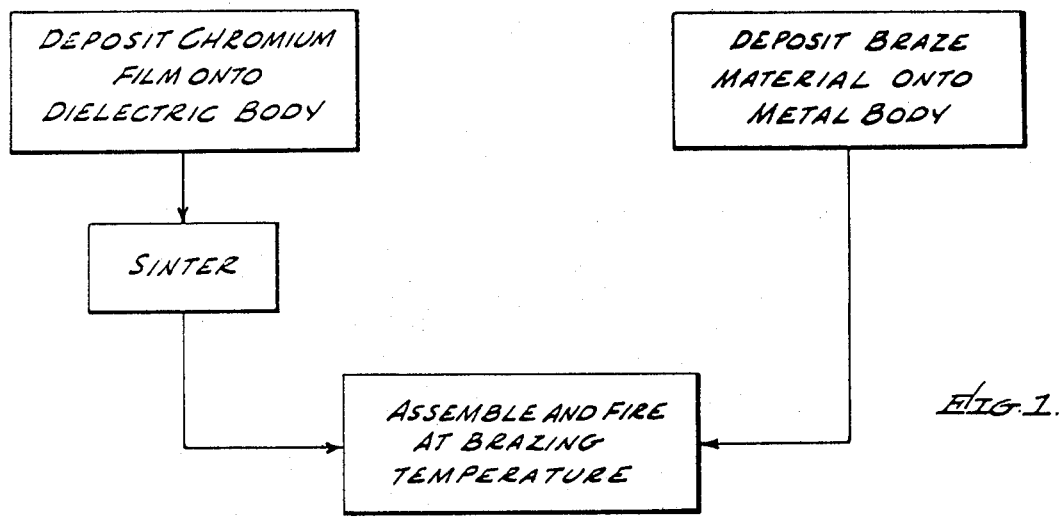
Fig. 1.
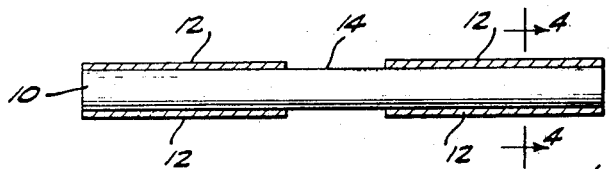 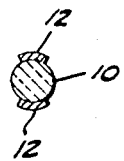
Fig. 3. Fig. 4.
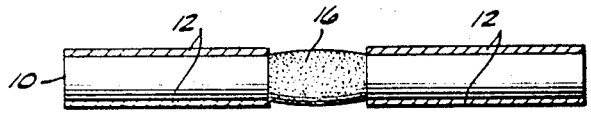
Fig. 5.
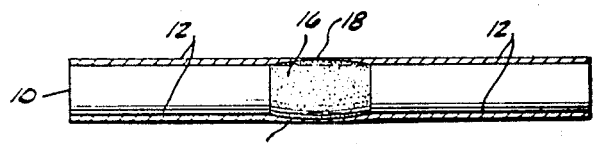
Fig. 6.
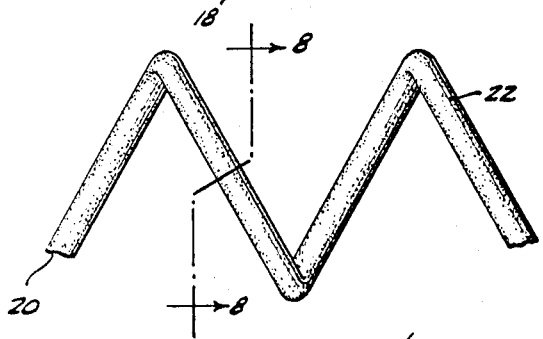 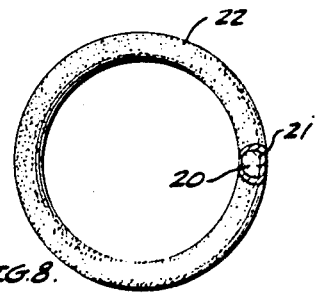
Fig. 7. Fig. 8.
INVENTOR.
LOUIS R. FALCE,
Paul M. Coffa
ATTORNEY

PATENTED NOV 30 1971 3,624,678

METHOD FOR MAKING DIELECTRIC-TO-METAL JOINTS FOR SLOW-WAVE STRUCTURE ASSEMBLIES

This is a division of application Ser. No. 579,648, filed Sept. 15, 1966 and now abandoned.

This invention relates to methods for making dielectric-to-metal joints and has particular application to the fabrication of supporting and encasing assemblies for slow-wave structures of the type used in traveling-wave tubes.

In electron beam tubes of the traveling-wave type, a stream of electrons is caused to interact with a propagating electromagnetic wave in a manner which amplifies the electromagnetic wave energy. In order to achieve the desired interaction, the electromagnetic wave is propagated along a slow-wave structure, such as an electrically conductive helix wound about the path of the electron stream. The slow-wave structure provides a path of propagation for the electromagnetic wave which is considerably longer than the axial length of the structure so that the traveling wave may be made to effectively propagate at nearly the velocity of the electron stream. Slow-wave structures of the helix type are usually supported within a vacuum envelope by means of a plurality of equally circumferentially spaced dielectric rods disposed between the slow-wave structure and the envelope.

A method which has been used to attach a slow-wave structure to its dielectric support rods involves painting or spraying a dispersion of molybdenum metal powder and powdered oxides of manganese, titanium, and silicon onto the support rods, sintering the rods at a temperature above 1,350° C. in wet hydrogen, and brazing the metallized and sintering rods to the slow-wave structure with a brazing alloy in sheet or wire form. Although dielectric-to-metal joints of good mechanical strength can be made by this method, the radiofrequency energy dissipation in such joints is excessively high for certain applications, and at the same time the thermal conductivity of these joints is not optimum.

A method commonly employed to mount a slow-wave structure and its support rods within the encasing envelope involves making the envelope in the form of a resilient tubular metallic clamp. The cross section of the clamp is initially circular, with a cross-sectional area greater than that of the structure-rod assembly to be inserted within the clamp, but with a normal diameter which is less than that of the circle circumscribing the structure-rod assembly. The clamp is first distorted by forces applied at a number of points corresponding to the number of rods so as to produce a geometric configuration more nearly identical to that of the structure-rod assembly. The structure-rod assembly is then inserted into the distorted clamp with the rods intermediate the points of application of the forces. Upon removal of the distorting forces, the clamp restores itself to nearly its original circular shape, and in doing so compresses the rods and the slow-wave structure into a rigid assembly. Since, with slow-wave structure encasements made according to the foregoing technique, the envelope and the dielectric support rods are merely in abutting contact with one another rather than being bonded or fused together, relatively poor heat transfer properties are provided between the rods and the envelope, and also excessive radiofrequency loss occurs at the rod-envelope contact regions.

It is an object of the present invention to provide a method for making a bonded slow-wave structure supporting and encasing assembly in which the bonds between the slow-wave structure and its support rods and between the support rods and the encasing member both possess outstanding thermal and electric properties.

It is another object of the present invention to provide a method for making a slow-wave structure supporting, encasing, and attenuating assembly which is capable of handling greater amounts of power than similarly dimensioned assemblies of the prior art.

It is yet another object of the present invention to provide simple and efficient methods for making slow-wave structure assemblies incorporating dielectric-to-metal joints having low radio frequency loss properties and a high thermal conductivity.

In fabricating a slow-wave structure supporting and encasing assembly and attaching the slow-wave structure thereto in accordance with a preferred embodiment of the method of the invention, a film of elemental chromium is vapor deposited onto at least a portion of each of a plurality of dielectric rods. The rods are assembled about the peripheral surface of a slow-wave structure, at least a portion of which has been provided with a coating of first braze material, with at least a portion of the coating contacting at least a portion of the chromium on the rods. The resultant assembly is heated in a dry hydrogen atmosphere to a temperature higher than the melting point of the first braze material but lower than the melting points of the respective materials of the rods and the slow-wave structure. Chromium is selectively removed from regions of the inwardly facing surfaces of the rods not contacting the slow-wave structure. A coating of second braze material having a melting point lower than the melting point of the first braze material is deposited over at least portions of the outwardly facing surfaces of the rods. The slow-wave structure and the rods are inserted into an encasing member of a material having a thermal coefficient of expansion substantially the same as that of the material of the rods. The resultant assembly is heated in a dry hydrogen atmosphere to a temperature higher than the melting point of the second braze material but lower than the melting points of the first braze material and the respective materials of the rods and the encasing member.

If it is desired to introduce electrical attenuation into the assembly, a film of attenuating material may be deposited onto exposed regions of the support rods subsequent to a sintering operation which follows the chromium deposition. After the deposition of the attenuating film, another film of elemental chromium may be deposited over the attenuating film.

Additional objects, advantages, and characteristic features of the present invention will become readily apparent from the following detailed description of preferred embodiments of the invention when considered in conjunction with the accompanying drawings in which:

FIG. 1 is a block diagram illustrating respective steps in making dielectric-to-metal joints according to the method of the invention;

FIG. 3 is a longitudinal view showing a slow-wave structure support rod after initial processing according to the method illustrated in FIG. 2;

FIG. 4 is a cross-sectional view taken along line 4—4 of FIG. 3;

FIGS. 5 and 6 are longitudinal views illustrating the rod of FIG. 3 at subsequent successive stages in its processing according to the method shown in FIG. 2;

FIG. 7 is a longitudinal view showing a slow-wave structure helix after initial processing in accordance with the method illustrated in FIG. 2;

FIG. 8 is a cross-sectional view taken along line 8—8 of FIG. 7;

Figure 2:
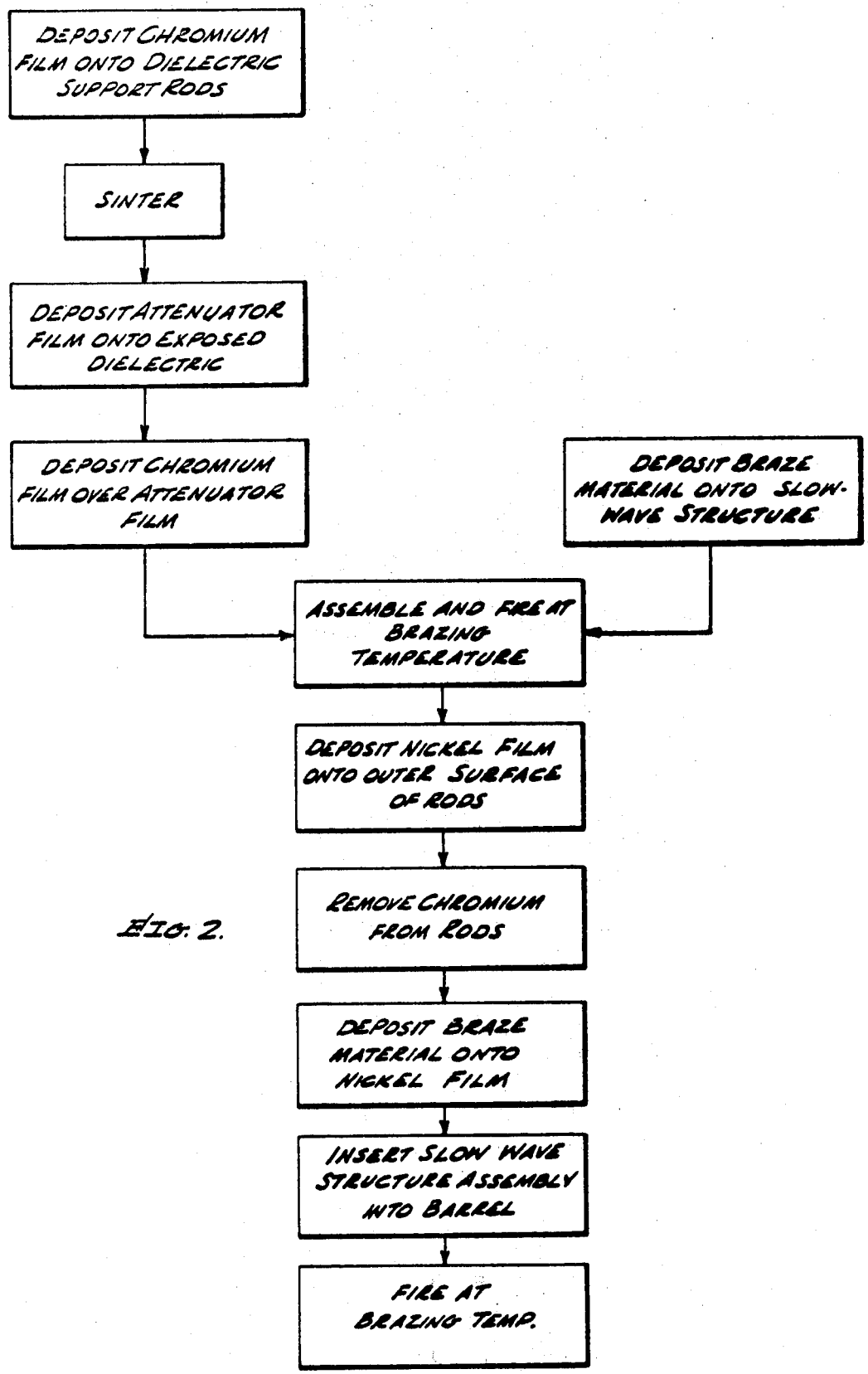
FIG. 2 is a block diagram illustrating respective steps in fabricating a slow-wave structure supporting, encasing, and attenuating assembly in accordance with a preferred embodiment of the method of the invention.
Figure 9:
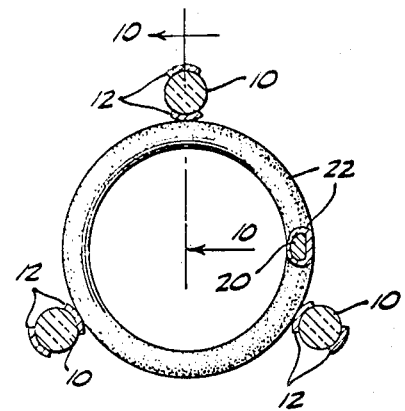
FIG. 9 is a cross-sectional view of a slow-wave structure and its support rods in assembled relation during subsequent processing in accordance with the method illustrated in FIG. 2.
Figure 10:
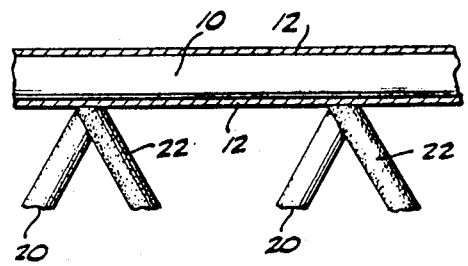
FIG. 10 is a longitudinal sectional view taken along line 10—10 of FIG. 9.
Figure 11:
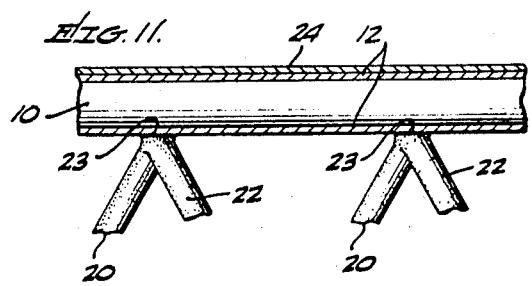
Figure 12:
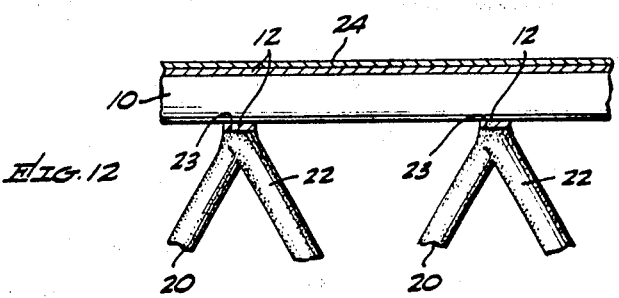
Figure 13:
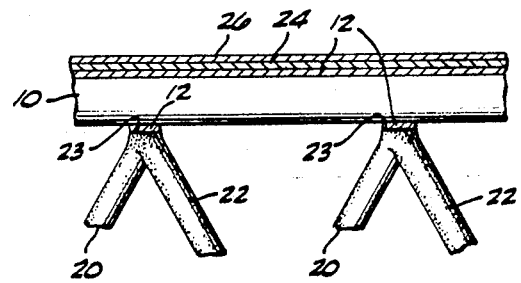
Figure 14:
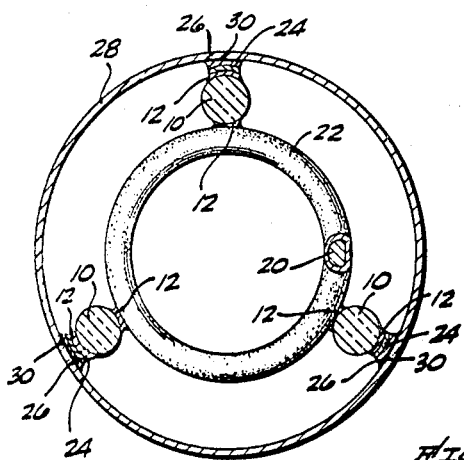

FIGS. 11, 12, and 13 are longitudinal views illustrating the assembly of FIG. 10 at subsequent successive stages in its processing in accordance with the method shown in FIG. 2; and FIG. 14 is a cross-sectional view similar to FIG. 9 illustrating a slow-wave structure and its support rods secured within an encasing barrel at the final stage of processing in accordance with the method shown in FIG. 2.

As is illustrated in FIG. 1, the first step in making a dielectric-to-metal joint in accordance with the method of the invention involves vapor depositing a film of elemental chromium onto the dielectric body to be joined. By elemental chromium it is meant chromium as a chemical element in contrast to being alloyed or combined with another substance. Examples of a few illustrative dielectric materials which may be used are alumina, beryllia, quartz, glass, and sapphire, it being understood that many other dielectric materials are also suitable. The particular material selected for a given application is the one whose dielectric properties are best suited to the desired application. The chromium film may, for example, be deposited onto the dielectric body by a technique called "ion plating", and which technique is described in detail in an article by D. M. Mattox entitled "Film Deposition Using Accelerated Ions," *Electrochemical Technology*, Vol. 2, No. 9–10, Sept.–Oct. 1964, pages 295–298. The chromium film preferably is deposited to a thickness essentially between 0.0001 inch and 0.001 inch.

The chromium-coated dielectric body may then be sintered by firing it in a dry hydrogen atmosphere at a temperature in a range extending essentially from 1,325° to 1,350° C. By a dry atmosphere it is meant an atmosphere having a dew point lower than −60° C., the dew point being the temperature at which condensation of water vapor in the atmosphere in question occurs. It is pointed out that the sintering step is not essential for making a dielectric-to-metal joint in accordance with the present invention; however, the sintering operation does increase the tensile strength of the resultant joint.

Prior to brazing the chromium-coated dielectric body to a metal body, the metal body to be joined is coated with braze material such as copper or a copper-gold or copper-silver alloy. The braze material may be deposited onto the metal body by means of the aforementioned technique of ion plating. The braze material should have a melting point lower than that of either of the materials to be joined. For example, when joining the dielectric beryllia (melting point approximately 2,530° C.) to the metal molybdenum (melting point approximately 2,620° C.), copper (which has a melting point of 1,083° C.) may be employed as the braze material.

The chromium-coated dielectric body and the braze material-coated metal body are then assembled together in the desired contacting relationship and fired in a dry hydrogen atmosphere at a temperature slightly higher than the melting point of the braze material but lower than the melting points of the materials to be joined in order to melt the braze material and bond the dielectric and metal bodies together. For the aforementioned exemplary materials (beryllia, molybdenum, and copper) appropriate brazing temperatures would be in a range extending essentially from 1,090° to 1,100° C.

In accordance with a preferred embodiment of the method of the present invention, the method may be employed to fabricate an assembly consisting of a slow-wave structure and its support rods mounted in an encasing barrel. Respective steps in the method are illustrated in the block diagram of FIG. 2, while the resultant structure at various stages of its fabrication is illustrated in FIGS. 3–14.

As is shown in FIGS. 3 and 4, portions of the circumferential surface a slow-wave structure support rod 10, which may be of a dielectric material such as beryllia, are first coated with a layer 12 of elemental chromium. The chromium layer 12, which may be vapor deposited onto the rod 10 by means of the aforementioned technique of ion plating, preferably has a thickness in the range essentially between 0.0001 inch and 0.001 inch. As may be seen, the chromium film 12 is located along longitudinally extending strips on diametrically opposite portions of the circumferential surface of the rod 10, while a cylindrical portion 14 of the surface of the rod 10 which is located approximately midway along the length of the rod remains exposed, i.e. is not covered with chromium.

The chromium-coated dielectric rod 10 may then be sintered by firing the rod in a dry hydrogen atmosphere at a temperature in a range extending essentially from 1,325° to 1,350° C. Again, it is pointed out that the sintering operation may be omitted, although sintering is highly desirable from the standpoint of increasing the tensile strength of the resultant joint.

As is shown in FIG. 5, a film 16 of attenuating material such as titanium carbide may then be deposited onto the exposed surface 14 of the rod 10, by means of cathodic sputtering for example, in order to introduce attenuation to the slow-wave structure assembly. The attenuating film 16 preferably has a tapered configuration with a thickness at its central region substantially greater than at its end regions in order to minimize reflections of electromagnetic waves as they travel axially along the rods 10 during operation of the device into which the rods are to be incorporated. A typical exemplary thickness for the attenuating film 16 is about 1 A. at the ends and about 1 micron at the center. It is pointed out that although other attenuating materials such as pyrolytically deposited carbon or graphite may be employed, titanium carbide is preferred because of its better thermal stability and its more constant resistivity as a function of temperature.

Next, the chromium deposition operation is repeated in order to deposit strips 18 of elemental chromium onto diametrically opposite surfaces of the attenuating film 16 which are aligned with the rod surfaces provided with the chromium strips 12 (see FIG. 6). The remainder of the structure is masked during this chromium deposition to prevent the redeposition of chromium onto previous chromium deposits and thereby allow the thickness of the chromium strips 18 to essentially equal that of the strips 12. It is pointed out that two separate chromium deposition operations are necessary only if a chromium sintering operation is included in the overall process, because if the sintering were performed subsequent to deposition of the titanium carbide, diffusion of titanium carbide into the dielectric rod would occur during sintering and thereby alter the resistive properties of the titanium carbide film. Therefore, it is preferred to first deposit most of the chromium, then sinter, then deposit the titanium carbide, and then deposit chromium over the titanium carbide. This ensures that the chromium, except for the relatively small portion covering the titanium carbide, can be sintered without adversely affecting the attenuation properties of the titanium carbide film.

It is also pointed out that for resultant devices having power levels sufficiently low so that attenuation is not needed, the steps of depositing the attenuator film 16 and the second chromium films 18 may be omitted. In this event it would not be necessary to provide the exposed rod surface 14 during the initial chromium deposition, but rather the chromium strips 12 could extend along the entire length of the rod 10.

As is shown in FIGS. 7 and 8, a slow-wave structure 20 to which the support rods 10 are to be attached is prepared by flattening its outer peripheral surface 21 and depositing a film 22 of braze material onto the flattened peripheral surface, although some braze material will also deposit onto the remaining surfaces of the slow-wave structure 20. It is pointed out that although the slow-wave structure 20 is illustrated as having a helical configuration, other types of slow-wave structures such as a ring-bar or a cloverleaf structure are also suitable. The braze material 22 may be any of the materials set forth above with respect to making a dielectric-to-metal joint by the method of FIG. 1 and may be deposited onto the slow-wave structure 20 by means of the aforementioned technique of ion plating. As a specific example, the slow-wave structure 20 may be of molybdenum, and the braze material 22 may be copper.

A plurality of the chromium-coated support rods 10 are then assembled about the outer peripheral surface of the slow-wave structure 20 in a manner such as is illustrated in FIG. 9 with the chromium strips 12 contacting the braze material 22. It is pointed out that in theory any number of rods 10 may be used to support the slow-wave structure 20 depending on particular design criteria, three such support rods being shown in FIG. 9 by way of example. The assembly is then fired in a dry hydrogen atmosphere at a temperature slightly higher than the melting point of the braze material 22 but lower than the melting points of respective materials of the slow-wave structure 20 and the rods 10 in order to melt the braze material 22 and form a brazed joint 23 (FIG. 11) between the rods 10 and the slow-wave structure 20. When copper is used as the braze material to join beryllia rods to a molybdenum slow-wave structure, appropriate brazing temperatures would be in a range extending essentially from 1,090° to 1,100° C.

After the slow-wave structure 20 has been brazed to the support rods 10, it is necessary to remove the chromium from the inwardly facing surfaces of the rods 10 which do not contact the slow-wave structure 20 in order to eliminate a short-circuiting path along the rods 10 between successive turns of the slow-wave structure 20. However, the chromium on the outwardly facing surfaces of the rods 10 should not be removed at this time because these surfaces subsequently must be brazed to an encasing barrel. Therefore, as is shown in FIG. 11, a film 24 of nickel is deposited, by means of the aforementioned technique of ion plating for example, over the chromium strips 12 on the outwardly facing surfaces of the rods 10. The chromium located between the brazed joints 23 on the inner surfaces of the rods 10 is then removed by immersing the assembly in concentrated hydrochloric acid at a temperature of around 50° C. for about 2 minutes, with the nickel film 24 protecting the chromium on the outer surfaces of the rods 10 from attack by the hydrochloric acid. The resultant structure after the selective chromium removal operation is illustrated in FIG. 12.

The assembly is then prepared for brazing to an encasing barrel which is preferably of a material having a thermal coefficient of expansion substantially the same as that of the material of the support rods 10. For example, for beryllia support rods the encasing barrel may be of niobium or a combination of materials such as molybdenum and copper alternately disposed along the length of the barrel in the desired relative extent to produce a net thermal coefficient expansion essentially the same as that of beryllia. As is shown in FIG. 13, prior to insertion of the assembly into the encasing barrel, a film 26 of braze material having a melting point lower than the melting point of the braze material used to bond the rods 10 to the slow-wave structure 20 is deposited onto the nickel film 24. This deposition may be carried out by means of the aforementioned technique of ion plating. An example of a particular braze material which may be used as the material 26 when joining a combined molybdenum and copper barrel to beryllia support rods is a copper-silver alloy consisting of essentially 28 percent copper and 72 percent silver.

The slow-wave structure 20 and its attached support rods 10 are then inserted into an encasing barrel 28 in a manner such as illustrated in FIG. 14, and the resultant assembly is fired in a dry hydrogen atmosphere at a temperature slightly higher than the melting point of the braze material 26 but lower than the melting points of the respective materials of the barrel 28 and the rods 10 and of the braze material 22 employed in the previous braze operation. For the aforementioned exemplary copper-silver alloy as the material 26, appropriate brazing temperatures would be in a range extending essentially from 840° to 850° C. Brazed joints 30 are thus formed between the barrel 28 and the respective rods 10 which bond the rods and the barrel together and thereby complete the slow-wave structure supporting and encasing assembly.

It should be apparent that while the present invention is particularly suited to bonding a slow-wave structure to its support rods and, in turn, bonding the support rods to an encasing barrel, the invention is generally applicable to the fabrication of dielecric-to-metal joints which have high thermal conductivity and low radiofrequency loss properties. When specifically employed to fabricate slow-wave structure supporting, encasing, and attenuating assemblies, the resultant assemblies are capable of handling greater amounts of power than similarly dimensioned assemblies of the prior art.

Thus, although the invention has been shown and described with respect to specific methods and devices, nevertheless, various changes and modifications obvious to a person skilled in the art to which the invention pertains are deemed to lie within the purview of the invention.

What is claimed is:

1. A method for fabricating a supporting and encasing assembly for a slow-wave structure and for attaching the slow-wave structure thereto comprising the steps of: vapor depositing a film of elemental chromium onto at least a portion of each of a plurality of dielectric rods, assembling said rods about the peripheral surface of a slow-wave structure at least a portion of which has been provided with a coating of first braze material with at least a portion of said coating contacting at least a portion of the chromium on said rods, heating the resultant assembly in a dry hydrogen atmosphere to a temperature higher than the melting point of said first braze material but lower than the melting points of the respective materials of said rods and said slow-wave structure, selectively removing chromium from regions of the inwardly facing surfaces of said rods not contacting said slow-wave structure, depositing a coating of second braze material having a melting point lower than the melting point of said first braze material over at least portions of the outwardly facing surfaces of said rods, inserting said slow-wave structure and said rods into an encasing member of a material having a thermal coefficient of expansion substantially the same as that of the material of said rods with said second braze material on the outwardly facing surfaces of said rods contacting said encasing member, and bonding said rods to said encasing member by heating the resultant assembly in a dry hydrogen atmosphere to a temperature higher than the melting point of said second braze material but lower than the melting points of said first braze material and the respective materials of said rods and said encasing member.

2. A method according to claim 1 wherein said dielectric rods are of beryllia, said slow-wave structure is of molybdenum, said first braze material is copper, and said second braze material is an alloy of copper and silver.

3. A method for fabricating a supporting and encasing assembly for a slow-wave structure and for attaching the slow-wave structure thereto comprising the steps of: vapor depositing a film of elemental chromium onto at least a portion of each of a plurality of dielectric rods, sintering the chromium-coated dielectric rods, assembling said rods about the peripheral surface of a slow-wave structure at least a portion of which has been provided with a coating of first braze material with at least a portion of said coating contacting at least a portion of the chromium on said rods, heating the resultant assembly in a dry hydrogen atmosphere to a temperature higher than the melting point of said first braze material but lower than the melting points of the respective materials of said rods and said slow-wave structure, selectively removing chromium from regions of the inwardly facing surfaces of said rods not contacting said slow-wave structure, depositing a coating of second braze material having a melting point lower than the melting point of said first braze material over at least portions of the outwardly facing surfaces of said rods, inserting said slow-wave structure and said rods into an encasing member of a material having a thermal coefficient of expansion substantially the same as that of the material of said rods with said second braze material on the outwardly facing surfaces of said rods contacting said encasing member, and bonding said rods to said encasing member by heating the resultant assembly in a dry hydrogen atmosphere to a temperature higher than the melting point of said second braze material but lower than the melting points of said first braze material and the respective materials of said rods and said encasing member.

4. A method for fabricating a supporting and encasing assembly for a slow-wave structure and for attaching the slow-wave structure thereto comprising the steps of: vapor depositing a film of elemental chromium onto at least a portion of each of a plurality of dielectric rods, assembling said rods about the peripheral surface of a slow-wave structure at least a portion of which has been provided with a coating of first braze material with at least a portion of said coating contacting at least a portion of the chromium on said rods, heating the resultant assembly in a dry hydrogen atmosphere to a temperature higher than the melting point of said first braze material but lower than the melting points of the respective materials of said rods and said slow-wave structure, depositing a film of nickel onto at least portions of the chromium on the outwardly facing surfaces of said rods, immersing the resultant assembly in hydrochloric acid to remove chromium from regions of the inwardly facing surfaces of said rods not contacting said slow-wave structure, depositing a coating of second braze material having a melting point lower than the melting point of said first braze material over at least portions of the nickel films, inserting said slow-wave structure and said rods into an encasing member of a material having a thermal coefficient of expansion substantially the same as that of the material of said rods with said second braze material on the outwardly facing surfaces of said rods contacting said encasing member, and bonding said rods to said encasing member by heating the resultant assembly in a dry hydrogen atmosphere to a temperature higher than the melting point of said second braze material but lower than the melting points of said first braze material and the respective materials of said rods and said encasing member.

5. A method for fabricating a supporting, attenuating, and encasing assembly for a slow-wave structure and for attaching the slow-wave structure thereto comprising the steps of: vapor depositing a film of elemental chromium onto portions of each of a plurality of dielectric rods leaving an exposed region along the surface of each of said rods, sintering the chromium-coated dielectric rods, depositing a film of attenuating material onto each said exposed region, vapor depositing a film of elemental chromium onto each said attenuating film, assembling said rods about the peripheral surface of a slow-wave structure at least a portion of which has been provided with a coating of first braze material with at least a portion of said coating contacting at least a portion of the chromium on said rods, heating the resultant assembly in a dry hydrogen atmosphere to a temperature higher than the melting point of said first braze material but lower than the melting points of the respective materials of said rods and said slow-wave structure, selectively removing chromium from regions of the inwardly facing surfaces of said rods not contacting said slow-wave structure, depositing a coating of second braze material having a melting point lower than the melting point of said first braze material over at least portions of the outwardly facing surfaces of said rods, inserting said slow-wave structure and said rods into an encasing member of a material having a thermal coefficient of expansion substantially the same as that of the material of said rods with said second braze material on the outwardly facing surfaces of said rods contacting said encasing member, and bonding said rods to said encasing member by heating the resultant assembly in a dry hydrogen atmosphere to a temperature higher than the melting point of said second braze material but lower than the melting points of said first braze material and the respective materials of said rods and said encasing member.

6. A method according to claim 5 wherein said attenuating material is titanium carbide.

7. A method according to claim 6 wherein the titanium carbide film is deposited by cathodic sputtering.

8. A method for fabricating a supporting, attenuating, and encasing assembly for a slow-wave structure and for attaching the slow-wave structure thereto comprising the steps of: vapor depositing a film of elemental chromium onto portions of each of a plurality of beryllia rods leaving an exposed region along the surface of each of said rods, sintering the chromium-coated beryllia rods in a dry hydrogen atmosphere at a temperature in a range extending essentially from 1,325° to 1,350° C., cathodically sputtering a film of titanium carbide onto each said exposed region, vapor depositing a film of elemental chromium onto each said titanium carbide film, assembling said rods about the peripheral surface of a molybdenum slow-wave structure at least a portion of which has been provided with a coating of copper with at least a portion of said copper coating contacting at least a portion of the chromium on said rods, heating the resultant assembly in a dry hydrogen atmosphere to a temperature in a range extending essentially from 1,090° to 1,100° C., depositing a film of nickel onto at least portions of the chromium on the outwardly facing surfaces of said rods, immersing the resultant assembly in hydrochloric acid to remove chromium from regions of the inwardly facing surfaces of said rods not contacting said slow-wave structure, depositing a coating of an alloy consisting essentially of 28 percent copper and 72 percent silver over at least portions of the nickel films, inserting said slow-wave structure and said rods into an encasing member of a material having a thermal coefficient of expansion substantially the same as that of beryllia with said alloy over the outwardly facing surfaces of said rods contacting said encasing member, and bonding said rods to said encasing member by heating the resultant assembly in a dry hydrogen atmosphere to a temperature in a range extending essentially from 840° to 850° C.

* * * * *